US010871565B2

United States Patent
Baba (10) Patent No.: US 10,871,565 B2
(45) Date of Patent: Dec. 22, 2020

(54) OBJECT DETECTION APPARATUS AND OBJECT DETECTION METHOD

(71) Applicant: DENSO CORPORATION, Kariya (JP)

(72) Inventor: Takahiro Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 162 days.

(21) Appl. No.: 16/062,432

(22) PCT Filed: Dec. 9, 2016

(86) PCT No.: PCT/JP2016/086796
§ 371 (c)(1),
(2) Date: Jun. 14, 2018

(87) PCT Pub. No.: WO2017/104580
PCT Pub. Date: Jun. 22, 2017

(65) Prior Publication Data
US 2018/0372866 A1 Dec. 27, 2018

(30) Foreign Application Priority Data

Dec. 17, 2015 (JP) ................... 2015-246686

(51) Int. Cl.
*G01S 13/931* (2020.01)
*G08G 1/015* (2006.01)
(Continued)

(52) U.S. Cl.
CPC .......... *G01S 13/931* (2013.01); *G01S 13/867* (2013.01); *G06K 9/00805* (2013.01);
(Continued)

(58) Field of Classification Search
CPC ........ G01S 13/931; G01S 13/867; G01S 7/41; G01S 7/4802; G01S 7/539;
(Continued)

(56) References Cited

U.S. PATENT DOCUMENTS

2003/0179084 A1* 9/2003 Skrbina ................ G01S 13/931
340/435
2008/0243390 A1* 10/2008 Nakamori .......... G06K 9/00805
701/301
(Continued)

FOREIGN PATENT DOCUMENTS

JP 2014-122873 7/2014

*Primary Examiner* — Erin F Heard
*Assistant Examiner* — Michael W Justice
(74) *Attorney, Agent, or Firm* — Maschoff Brennan (57) ABSTRACT

An object detection apparatus includes a radar-region-setting-unit setting a detection region of an object as a radar search region based on a detected position of the object detected by a radar, an image-region-setting-unit setting the detection region of the object as an image search region based on the detected position of the object detected by a monocular camera, an object-determination-unit determining the object detected by a radar and the monocular camera as the same object under a condition that an overlapping portion of the radar search region and the image search region exists, and a two-wheeler-determination-unit determining whether an object type detected by the monocular camera is a two-wheeler. The image-region-setting-unit enlarges the image search region compared with a case where the object type is not the two-wheeler, under a condition that the object type is determined as the two-wheeler.

20 Claims, 7 Drawing Sheets

(51) Int. Cl.
  *G08G 1/04* (2006.01)
  *G01S 13/86* (2006.01)
  *G08G 1/16* (2006.01)
  *G06K 9/00* (2006.01)
  *G06K 9/20* (2006.01)
  *G06K 9/32* (2006.01)

(52) U.S. Cl.
  CPC ....... *G06K 9/00825* (2013.01); *G06K 9/2054* (2013.01); *G06K 9/3241* (2013.01); *G08G 1/015* (2013.01); *G08G 1/04* (2013.01); *G08G 1/166* (2013.01)

(58) Field of Classification Search
  CPC ........ G01S 7/52036; G01V 3/12; G01V 8/10; G01V 11/00; G06K 9/00805; G06K 9/00825; G06K 9/2054; G06K 9/3241; G08G 1/015; G08G 1/044; G08G 1/166
  USPC ..................................... 342/70, 66
  See application file for complete search history.

(56) References Cited

U.S. PATENT DOCUMENTS

2009/0187321 A1\* 7/2009 Otsuka ...................... B60T 7/22
                                                         701/70
2014/0139369 A1\* 5/2014 Baba ........................ G01S 13/50
                                                         342/146

\* cited by examiner

OBJECT DETECTION APPARATUS AND OBJECT DETECTION METHOD

CROSS-REFERENCE TO RELATED PATENT APPLICATION

This application is based on earlier Japanese Patent Application No. 2015-246686 filed Dec. 17, 2015, the description of which is incorporated herein by reference.

BACKGROUND

Technical Field

The present disclosure relates to an object detection apparatus and an object detection method that detect an object existing around an own vehicle, using a radar and a monocular camera.

Background Art

According to a collision avoidance system of a vehicle, in the case where a positional relationship between objects individually detected by a radar and a stereo camera satisfies a predetermined judgement criterion, the collision avoidance system determines the objects as the same object, in order to improve a detection accuracy of an object existing around an own vehicle, Instead of using the stereo camera, a monocular camera is used to accomplish a cost reduction. However, the monocular camera has a characteristic in which a detection accuracy is relatively good for a width direction of the object with respect to the own vehicle, while it has a characteristic in which a detection accuracy is poor for a distance direction of the object.

Patent Literature 1 discloses that an apparatus determines a detected position of an object detected by a radar as a reference point, and determines a radar search region in view of an error range of the detected position of the object detected by the radar.

In addition, the apparatus determines the detected position of the object detected by a monocular camera as the reference point, and determines an image search region in view of the error range of the detected position of the object detected by the monocular camera.

The apparatus determines the objects detected by the radar and the monocular camera as the same object, under a condition where an overlapping portion is present between the radar search region and the image search region.

According to this configuration, even if the detected position of each object detected by each of the radar and the monocular camera does not completely correspond to each other, the apparatus can determine the objects detected by the radar and the monocular camera as the same object, under the condition where the overlapping portion is present between the radar search region and the image search region.

CITATION LIST

Patent Literature

[PTL 1] JP 2014-122873 A

It is understood that if a type of the object is a two-wheeler, the detection accuracy of an object position detected by the monocular camera tends to decline.

SUMMARY

In an object detection apparatus using the radar and the monocular camera, the main purpose of the present disclosure is to provide an object detection apparatus and an object detection method that can improve the detection accuracy of the object if the object is the two-wheeler.

In a first aspect of the present disclosure, an object detection apparatus detecting an object existing around an own vehicle, using a radar and a monocular camera, includes: a radar region setting unit setting, based on a first position which is a detected position of the object detected by the radar, a detection region of the object including the first position, to be a radar search region; an image region setting unit setting, based on a second position which is a detected position of the object detected by the monocular camera, the detection region of the object including the second position to be an image search region; an object determination unit determining the object detected by the radar and the monocular camera to be the same object, under a condition that there is a region in which the radar search region and the image search region overlap with each other; and a two-wheeler determination unit determining whether a type of the object detected by the monocular camera is a two-wheeler, in which the image region setting unit is configured to enlarge the image search region in comparison with a case where the type of the object is not the two-wheeler, under a condition that the type of the object is determined as the two-wheeler.

If the apparatus detects the object around the own vehicle using the monocular camera, the accuracy of the detected position of the object detected from a captured image of the monocular camera declines in a case where the object is the two-wheeler. Therefore, even if the object detected by the radar and the monocular camera is the same object, the apparatus may erroneously detect the object as a non-identical object.

When the apparatus determines that the type of the object is the two-wheeler, the apparatus determines that an error included in the detected position of the object detected by the monocular camera is large in comparison with the case where the type of the object is not the two-wheeler. In this case, the apparatus enlarges the image search region.

As described, even if the detected position of the two-wheeler detected by the monocular camera has a large error, an overlapping portion can be produced between the radar search region (that is set based on the detected position of the object by the radar) and the image search region. Thereby, the apparatus accurately identifies the two-wheeler using the radar and the monocular camera.

BRIEF DESCRIPTION OF THE DRAWINGS

The above purpose and other purposes, features, and advantages for the present disclosure are clearer in the following descriptions with reference to the accompanying drawings.

The drawings are described as follows.

DESCRIPTION OF THE EMBODIMENTS

In the followings, embodiments will be described with reference to the drawings.

Note that, in the respective following embodiments, the same signs are applied in the drawing, at portions that are the same or equivalent with each other, and description thereof will be omitted to the same portions.

An object detection apparatus 10 mounted in an own vehicle, detects an object existing around the own vehicle. Object information detected by the object detection apparatus 10 is used for various types of vehicle controls over a collision avoidance with the own vehicle and so on.

For example, the object information is used for various type of vehicle controls such as PCS (Pre-Crash safety system), and ACC (Adaptive cruise control).

Figure 1:
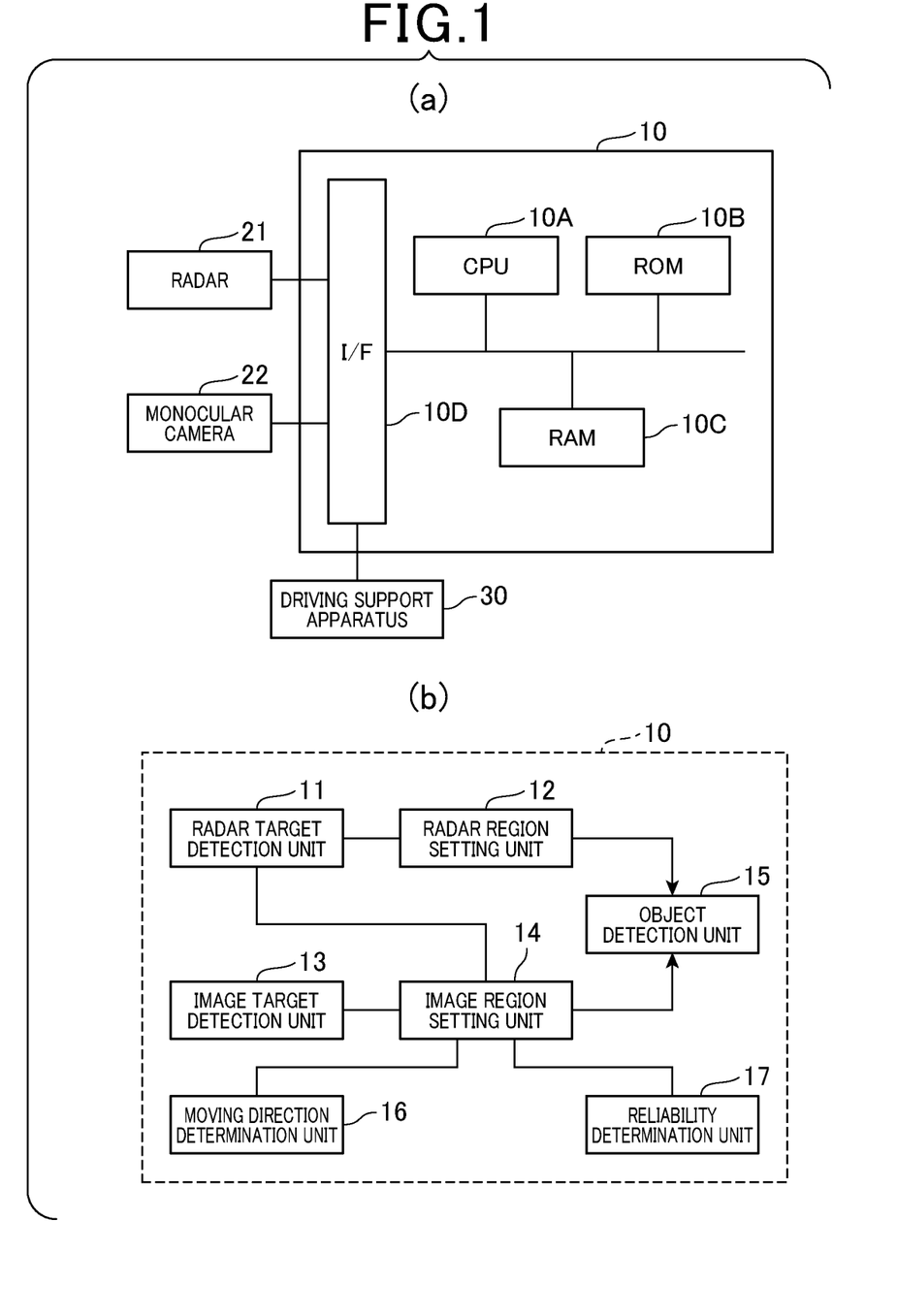
FIG. 1, in its (a) and (b), shows a block diagram illustrating hardware of an object detection apparatus and a functional block diagram according to the present embodiment.

In FIG. 1 (*a*), the object detection apparatus 10 is communicatively connected with a radar 21, a monocular camera 22, and a driving support apparatus 30.

The radar 21 receives and transmits electromagnetic waves having directivity, such as millimeter waves, and a laser. The radar 21 sets, as a radar signal, received and transmitted data of a distance, an azimuth, and a relative speed etc. to the object reflecting the electromagnetic wave, and outputs the data to the object detection apparatus 10.

The monocular camera 22 includes imaging elements such as CCD (Charged-Coupled Device) and CMOS (Complementary Metal-Oxide Semiconductor), and images surroundings of the own vehicle at a predetermined field angle. The monocular camera 22 sets a captured image obtained thereby as an image signal, and outputs the captured image to the object detection apparatus 10.

The object detection apparatus 10 includes a CPU (Central Processing Unit) 10A, a ROM (Read Only Memory) 10B, a RAM (Random Access Memory) 10C, an input-output interface 10D, and so on. The object detection apparatus 10 realizes each function by executing a program installed in the ROM 10B by the CPU 10A. The ROM 10B corresponds to a non-transitory computer readable storage medium. A storage medium includes computer readable electronic mediums such as, for example, DVD-ROM (Digital Versatile Disk Read Only Memory), CD-ROM (Compact Disc Read Only Memory), and hard disc, other than the ROM 10B. In particular, the object detection apparatus 10 receives the radar signal obtained from the radar 21 and the image signal obtained from the monocular camera 22 at a constant period.

The object detection apparatus 10 executes various types of functions performed by a radar target detection unit 11, a radar region setting unit 12, an image target detection unit 13, an image region setting unit 14, and an object detection unit 15, as illustrated in FIG. 1(*b*), using the received radar signal and the image signal.

The radar target detection unit 11 identifies the object detected based on the radar signal as the radar target. In addition, the radar target detection unit 11 identifies a position of the radar target (a detection point Pr: the first position) with respect to an own vehicle 40, by applying the positional information of the identified radar target to a X-Y plane illustrated in FIG. 2.

Figure 2:
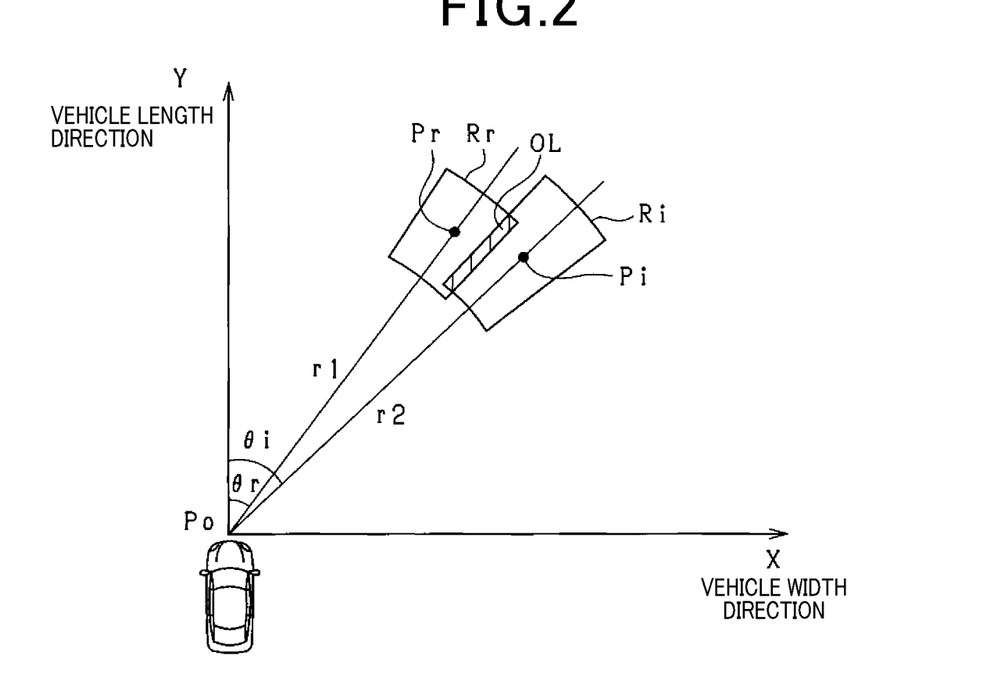
FIG. 2 is a diagram illustrating a radar search region and an image search region.

Note that the X-Y plane shown in FIG. 2 is defined such that an X axis is a width direction (lateral direction) of the own vehicle 40 and a Y axis is a vehicle length direction (a front direction). On the X-Y plane, a front edge position of the own vehicle 40 (a position where the radar 21 is disposed) is set as a reference point Po, and the detection point Pr of the radar target is represented as a relative position with respect to the reference point Po.

Note that FIG. 2 illustrates an example in which the object (that is, the radar target) exists on a front right side of the own vehicle 40. Furthermore, the radar target detection unit 11 may calculate the detection point Pr as well as the relative speed with respect to the target and so on.

As illustrated in FIG. 2, the radar region setting unit 12 sets a radar search region Rr around the detection point Pr of the radar target detected by the radar target detection unit 11. In particular, the radar region setting unit 12 allows a distance between the reference point Po and Pr (that is, a radius of a circle around the reference point Po) to have a width including a expected error range, and sets, as the radar search region Rr, the region with the width including the expected error range in a circumferential direction of the circle around the reference point Po. Note that it is said that the circumferential direction is a direction orthogonal to a straight line connecting between the reference point Po and the detection point Pr.

Figure 3:
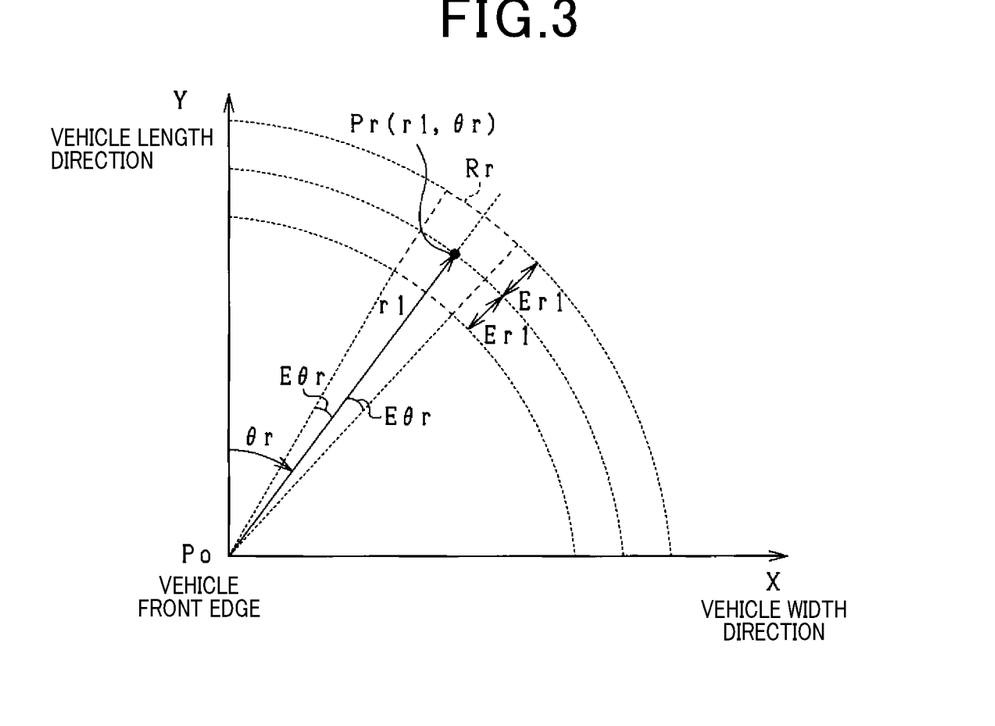
FIG. 3 is a diagram illustrating a radar search region.

In detail, as illustrated in FIG. 3, on the basis of a distance r1 between the reference point Po and the detection point Pr, and an angle θr in the circumferential direction with respect to the Y axis of the detection point Pr of the radar target, as for each of the distance direction and the circumferential direction, the radar region setting unit 12 sets the region with the width including the preset expected error range, as the radar search region Rr, based on characteristics of the radar 21.

For example, as for the detection point Pr (r1, θr), the expected error in the distance direction is set as ±Er1, and the expected error of the angle in the circumferential direction is set as ±Eθr. As for the radar search region Rr, a range in the distance direction is represented as (r1−Er1) to (r1+Er1), and an angle range in the circumferential direction is represented as (θr−Eθr) to (θr+Eθr).

That is, the radar search region Rr is set within a range of a constant angle 2Eθr including the angle θr in the circumferential direction with respect to the reference point Po. In particular, the radar search region Rr is identified with the angle range in the circumferential direction from (θr−Eθr) to (θr+Eθr) and the direction range in which the distance from the reference point Po ranges from (r1−Er1) to (r1+Er1).

The image target detection unit 13 identifies the object detected by analyzing the captured image represented by the image signal, as the image target. For example, the image target detection unit 13 identifies the image target, with a matching processing using a pre-registered target model. The target model is prepared for each type of the image target. Thereby, the type of the image target is also identified. The type of the image target includes a four-wheel vehicle, a two-wheeler, a pedestrian, an obstruction such as a guard rail, and so on. Note that the two-wheeler includes a bicycle, a saddle type of motorcycle, and so on.

The image target detection unit 13 identifies the position of the identified image target relative to the own vehicle 40

(a detected position Pi: a second position), by applying the positional information of the identified image target to the X-Y plane illustrated in FIG. 2. Note that the image target detection unit 13 identifies the position of the identified image target (the detected position Pi) on the X-Y plane, based on a position in an upper and lower direction of the image target in the captured image.

It is described in detail with reference to the example of the captured image in FIG. 4.

Firstly, the image target detection unit 13 extracts a detection region T1 of the image target from the captured image, by the matching processing using the target model. The image target detection unit 13 identifies the position in the distance direction on the X-Y plane, based on the position (coordinate) in the upper and lower direction in the detection region T1 of the extracted image target. Herein, the image target detection unit 13 identifies the position in the distance direction on the X-Y plane in FIG. 2, based on a position of a ground point T1a of the image target at the detection region T1 of the image target.

Note that, in the captured image, as the ground point T1a of the image target is located at a position closer to FOE (Focus of Expansion), the image target exists at a position farther from the own vehicle 40. Therefore, the position in the distance direction on the X-Y plane is longer. This correlation is stored in advance, whereby the image target detection unit 13 identifies the position in the distance direction on the X-Y plane, based on the ground point T1a of the image target.

In addition, the image target detection unit 13 identifies the angle in the circumferential direction of the image target (that is, an angular position relative to the front direction of the own vehicle 40), based on a position in a right and left direction of the image target in the captured image. That is, as a displacement (inclination) of an angular direction of the image target based on the front direction of the own vehicle 40 (in detail, a straight line in X=0) is larger, the displacement in the right and left direction of the image target tends to be larger based on FOE of the monocular camera 22. Therefore, the image target detection unit 13 can identify the position in the circumferential direction of the image target on the X-Y plane in FIG. 2, based on a distance between FOE and a vertical line passing through a center of the image target at the captured image in FIG. 4.

As illustrated in FIG. 2, the image region setting unit 14 sets an image search region Ri around the detected position Pi of the image target detected by the image target detection unit 13.

In particular, the image region setting unit 14 allows the distance between the reference point Po and Pr (that is, the radius of the circle around the reference point Po) to have the width including the expected error range, and sets, as the image search region Ri, the region with the width including the expected error range in the circumferential direction of the circle around the reference point Po. Note that it is said that the circumferential direction is the direction orthogonal to the straight line connecting between the reference point Po and the detected position Pi.

Figure 5:
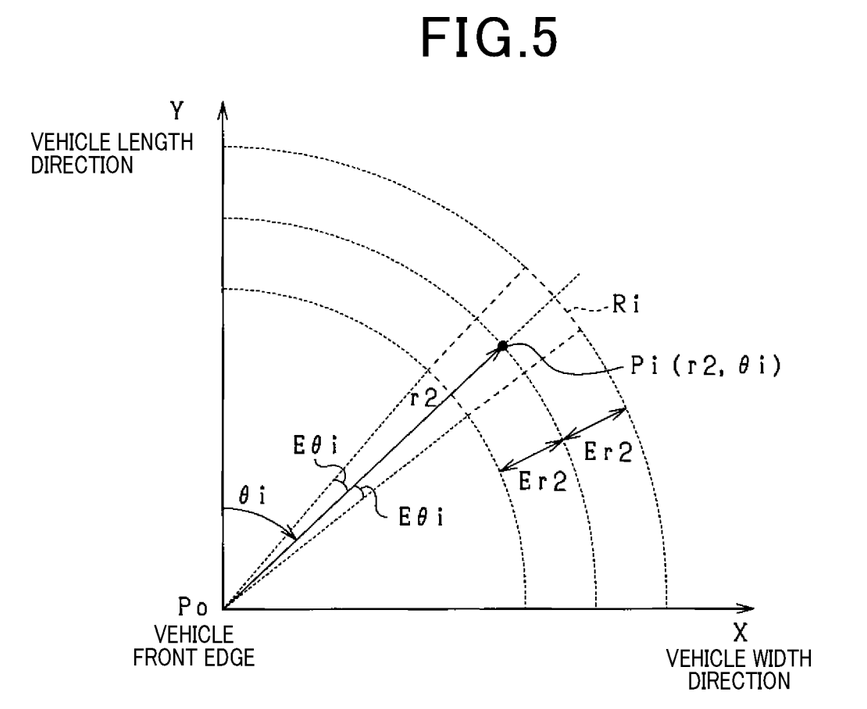
FIG. 5 is a diagram illustrating an image search region.

In detail, as illustrated in FIG. 5, on the basis of a distance r2 (between the reference point Po and the detection point Pi) and an angle $\theta i$ (in the circumferential direction with respect to the Y axis) of the detection point Pr of the radar target, as for each of the distance direction and the circumferential direction, the image region setting unit 14 sets the region with the width including the preset expected error range, as the radar search region Rr, based on characteristics of a monocular camera 3.

For example, as for the detection point Pr (r2, $\theta i$), the expected error in the distance direction is set as ±Er2, and the expected error of the angle in the circumferential direction is set as ±E$\theta i$. As for the radar search region Ri, a range in the distance direction (a first search range) is represented as (r2−Er2) to (r2+Er2), and the angle range in the circumferential direction (a second search range) is represented as ($\theta i$−E$\theta i$) to ($\theta i$+E$\theta i$).

That is, the image search region Ri is set within a range of a constant angle 2E$\theta i$ including the angle $\theta i$ in the circumferential direction with respect to the reference point Po. In particular, the image search region Ri is identified with the angle range in the circumferential direction (the second search range) from ($\theta i$−$\theta i$) to ($\theta i$+E$\theta i$) and the direction range (the first search range) in which the distance from the reference point Po ranges from (r2−Er2) to (r2+Er2).

In the case where the apparatus detects the image target with the matching processing by the target model using the captured image, the detection accuracy of the distance direction of the image target declines when the position of the ground point T1a of the image target in the captured image is not accurately identified. It is understood that if the object is the two-wheeler, the detection accuracy of the detected position of the ground point T1a of the image target tends to decline, the detection accuracy of the distance direction of the object tends to decline.

That is, if the object is the two-wheeler, in the image processing, it is difficult to extract wheel portions (characterizing portions of the two-wheeler). If the wheel portions of the two-wheeler are not accurately identified, the position of the ground point T1a of the image target is displaced in the upper and lower direction with respect to the position of the ground point T1a of the original image target. Thereby, the detection accuracy of the distance direction declines. For example, in FIG. 4, in a case where the wheel portions of the two-wheeler are not accurately extracted, if feet of an occupant are detected as the detection region T1 of the image target, the ground point T1a of the image target is displaced in the upper direction (that is, a direction close to FOE) with respect to the original position. Thereby, it may be recognized that the position in the distance direction of the two-wheeler with respect to the own vehicle 40 is positioned at a position far from the true position.

In the case where the type of the image target detected by the image target detection unit 13 is the two-wheeler, the image region setting unit 14 enlarges the image search region Ri in a distance direction r in comparison with the case where the type of the image target (object) is not the two-wheeler (for example, the case of a four-wheel vehicle, a pedestrian, or the like). Note that the case where the type of the image target is not the two-wheeler may be a case where the apparatus determines that each object recognized as a moving object is not the two-wheeler.

For example, if the type of the object is not the two-wheeler, the apparatus sets the expected error in the distance direction to be ±Er2a as a default value. On the other hand, if the type of the object is the two-wheeler, the apparatus sets the expected error in the distance direction to be a value equal to ±Er2a (the default value) multiplied by a predetermined corrective coefficient C1 (C1>1). As described, if the object is the two-wheeler, the apparatus enlarges the image search region Ri in distance direction.

The object detection unit 15 determines whether or not the image target be input from the image target detection unit 13 and the radar target to be input from the radar target detection unit 11 are generated from the same object. That is, the object detection unit 15 determines whether or not there is a region in which the radar search region Rr and the image search region Ri overlap with each other (an overlapping portion OL) on the X-Y plane (see FIG. 2). If the object detection unit 15 determines that there is the overlapping portion OL, it determines that the image target and the radar target are the same object. On the other hand, if there is no overlapping portion OL in the radar search region Rr and the image search region Ri, the object detection unit 15 determines that the image target and the radar target are not the same object.

The driving support apparatus 30 includes a speaker that outputs an alarm sound and a guide sound, a seat belt, a brake, and so on, as an in-vehicle equipment. The driving support apparatus 30 determines whether or not the driving support is required for the object detected by the object detection apparatus 10. If the driving support apparatus 30 determines that the driving support is required, it actuates various types of in-vehicle equipment.

For example, the driving support apparatus 30 calculates TTC (Time to Collision) that is a margin time of a collision between the object detected by the object detection unit 15 and the own vehicle 40. TTC (Time to Collision) is an evaluation value representing how many seconds is required for the own vehicle to collide with the object if the vehicle runs at the current vehicle speed. The TTC is defined such that the smaller the TTC, the higher the risk of collision, and the larger the TTC, the lower the risk of collision. TTC (Time to Collision) can be calculated by a method in which the distance between the object and the own vehicle 40 in a traveling direction thereof is divided by the relative speed to the object, and so on. The relative speed to the object can be calculated by subtracting the own vehicle speed from a vehicle speed of a leading vehicle. Note that TTC (Time to Collision) may be calculated, taking into account a relative acceleration.

If TTC (Time to Collision) is within an actuation time of the in-vehicle equipment, driving support apparatus 30 actuates the in-vehicle equipment. Note that the actuation time of each in-vehicle equipment is set depending on the type of the object. For example, if the actuation time in a case where the object is the pedestrian, is compared with the actuation time in a case where the object is the two-wheeler, the degree of risk in the case of the two-wheeler is higher than that of the pedestrian. Therefore, in the case of the two-wheeler, the actuation time is set to a short time.

Next, a proceeding of an object detection processing performed by the object detection apparatus 10 is described with reference to a flowchart of FIG. 6. Note that the object detection apparatus 10 repeatedly performs the following processing at a predetermined period.

The radar target detection unit 11 detects the radar target (S11), and the radar region setting unit 12 sets the radar search region Rr based on the radar target (S12). Next, the image target detection unit 13 detects the image target (S13). The image target detection unit 13 determines whether or not the type of the image target detected in S13 is the two-wheeler (S14). In S14, the type of the object detected in S13 may be either the pedestrian and the two-wheeler. In this case, the image target detection unit 13 determines whether the speed of the target is at least a predetermined value (for example, 20 km/h) or more. If the speed is the predetermined value or more, the image target detection unit 13 determines that the target is the two-wheeler.

If the speed is less than the predetermined value, the image target detection unit 13 determines that the target is the pedestrian. If the image target detection unit 13 determines that the image target is the two-wheeler, in S14, the image region setting unit 14 sets the image search region Ri for the two-wheeler (S15). After that, the process proceeds to S17. That is, in S14, the image region setting unit 14 multiplies the expected error ±Er2a in the distance direction by the predetermined corrective coefficient C1 to set the image search region Ri. On the other hand, if the image target detection unit 13 determines that an image target GT is not the two-wheeler in S14, the image region setting unit 14 sets the image search region Ri based on the expected error ±Er2a in the distance direction (S16). Then, the process proceeds to S17.

In S17, the object detection unit 15 determines whether or not there is an overlapping portion OL of the detection unit Rr and the image search region Ri. If the object detection unit 15 determines that there is an overlapping portion OL, it determines that the radar target and the image target are the same object (S18). On the other hand, if there is no overlapping portion OL, the processing terminates. In this case, the object detection unit 15 determines that the radar target and the image target are not the same object, and then the driving support performed by the driving support apparatus 30 is not implemented.

In the above descriptions, the present invention has the following good effects.

If the apparatus detects the object existing around the own vehicle 40 using the monocular camera 22, the accuracy of the detected position of the object detected from the captured image of the monocular camera 22 declines in the case where the object is the two-wheeler. Therefore, even though the object detected by the radar 21 and the monocular camera 22 is the same object, the apparatus may erroneously detect the object as a non-identical object. In this embodiment, if the apparatus determines that the type of the object is the two-wheeler, it is determined that the error included in the detected position of the object detected by the monocular camera 22 is larger, in comparison with the case where the type of the object is not the two-wheeler, and the image search region is enlarged.

As described, even if the detected position of the two-wheeler detected by the monocular camera 22 has a large error, the overlapping portion OL of the radar search region (that is set based on the detected position of the object by the radar 21) and the image search region can be produced. Thereby, the apparatus identifies accurately the two-wheeler using the radar and the monocular camera.

When detecting the object existing around the own vehicle 40 using the monocular camera 22, it estimates the distance between the own vehicle 40 and the object based on the position of the object in the captured image. At that time, in the case of the two-wheeler, since the feet of an occupant B are separated from the ground (see FIG. 8(*a*), (*b*)), the object position in the captured image cannot be accurately identified, and a large error may occur which in a detection value of the distance between the own vehicle 40 and the object.

In this embodiment, under the condition where the apparatus determines that the type of the object is the two-wheeler, the image search region Ri in the distance direction between the own vehicle 40 and the object is enlarged, in comparison to the case where the type of the object is not the two-wheeler. As described, if ranging accuracy of the object declines because the object is the two-wheeler, the apparatus can precisely detect the two-wheeler using both the radar 21 and the monocular camera 22.

The above embodiment may be modified as following example, for example. Note that the same reference numbers are applied to configurations similar to the above-described configurations and detailed explanation will be omitted. The above embodiment and the following embodiments can be implemented in combination with each other.

Figure 7:
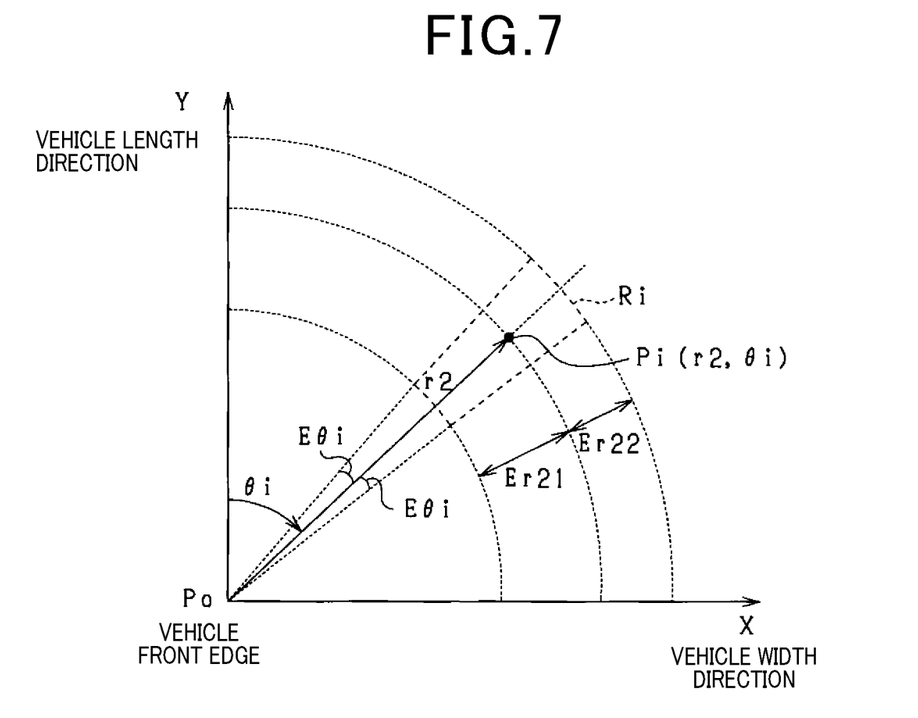
FIG. 7 is a diagram illustrating an image search region.

If the image target is the two-wheeler and the apparatus enlarges the image search region Ri in the distance direction, the apparatus may enlarge a region toward the own vehicle 40 within the image search region Ri, in comparison to the case where the type of the object is not the two-wheeler. That is, as illustrated in FIG. 7, if a distance on a closer side from the detected position Pi of the image target and a distance on a farther side therefrom are set as Er21 and Er22 respectively in the distance range of the image search region Ri, the apparatus enlarges the image search region Ri such that the distances are set to Er21>Er22. In this case, the apparatus may employ either a configuration for enlarging only the distance on the close side, of the distance on the closer side and the distance on the farther side, or a configuration for enlarging the both distances.

When the image target is the two-wheeler, it is considered that a camera image tends to be detected on the farther side in the distance. In this respect, the apparatus enlarges the image search region Ri such that the region on an own vehicle 40 side (a near side) is enlarged as described above, the apparatus can implement more properly the determination whether or not the radar target and the image target are the same object.

In short, if the apparatus enlarges the image search region Ri, Er21≠Er22 may be set. In this case, the distances may be set to Er21>Er22 or Er21<Er22. In particular, Er21>Er22 may be better.

In the above descriptions, the example is described in which the apparatus enlarges the image search region Ri in the distance direction if the image target is the two-wheeler. On the other hand, in the case where the image target is two-wheeler, the apparatus may enlarge at least one of the region in the distance direction of the image search region Ri and the region in the circumferential direction thereof.

When the apparatus enlarges the image search region Ri, the overlapping portion OL of the radar search region Rr and the image search region Ri tends to occur. Thereby, a possibility of a false detection of the object (two-wheeler) may be increased. If the apparatus determines that the image target is the two-wheeler, it may determine whether or not enlarging the image search region Ri depending on the traveling detection of the two-wheeler.

Figure 8:
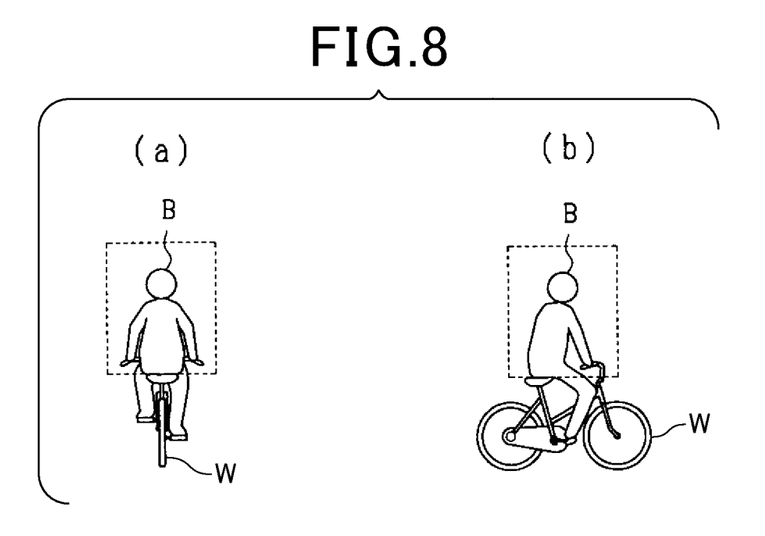
FIG. 8 is a diagram illustrating directions of a two-wheeler.

That is, when the two-wheeler is present ahead of the own vehicle 40, a longitudinal direction state is present in which wheels W of the two-wheeler are arranged in a front-back direction with respect to the own vehicle 40, as illustrated in FIG. 8(a), and a lateral direction state is present in which wheels W of the two-wheeler are arranged in a right and left direction with respect to the own vehicle 40, as illustrated in FIG. 8(b). If the wheels W of the two-wheeler are present in the longitudinal direction, there is a difficulty to extract wheels W (characterizing portions of the two-wheeler) in the image processing. Therefore, the ranging accuracy of the two-wheeler tends to decline. On the other hand, if the wheels W of the two-wheeler are positioned in the lateral direction, it is considered that the apparatus can readily detect the wheels W (characterizing portions of the two-wheeler).

Figure 6:
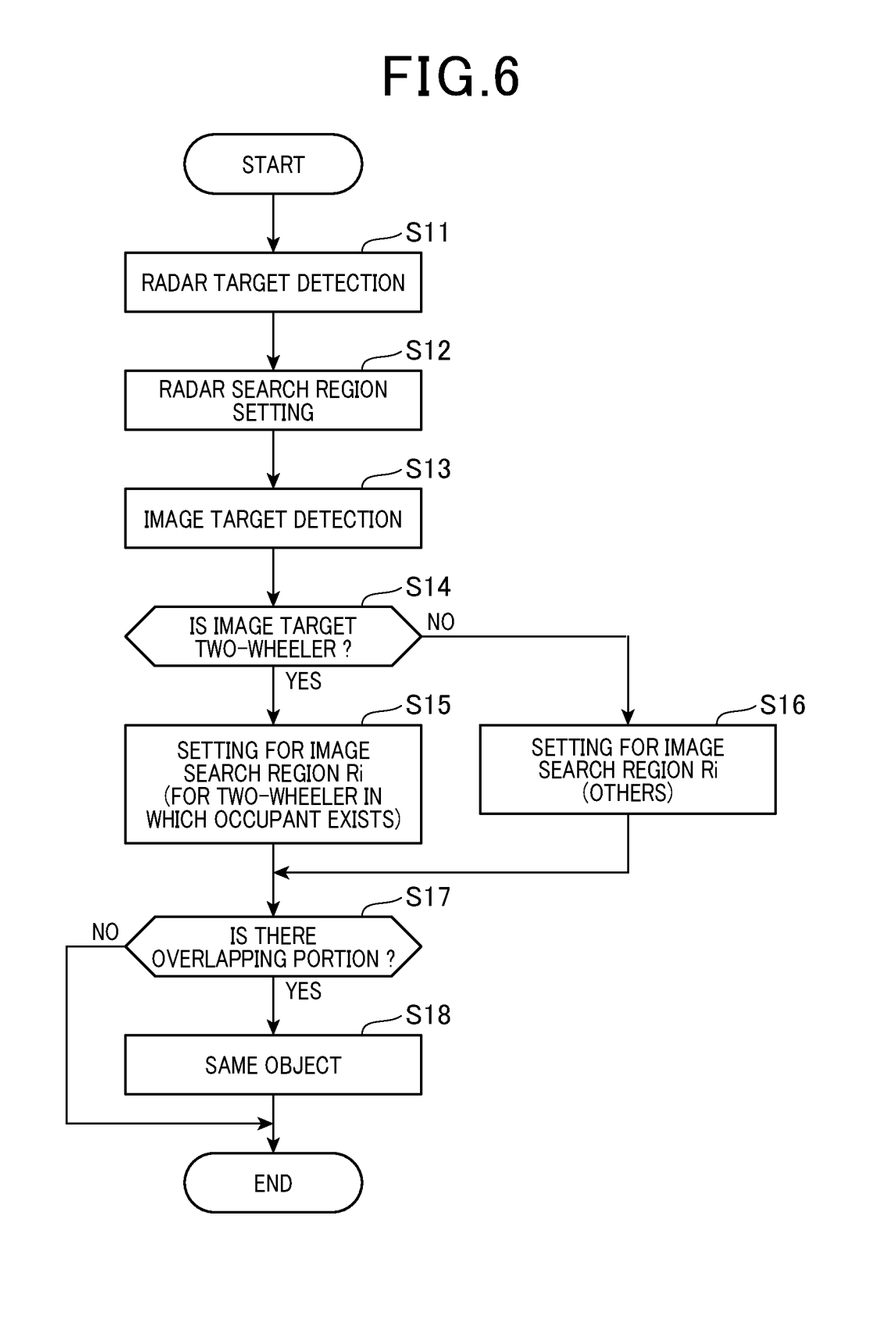
FIG. 6 is a flowchart of an object detection processing performed by an object detection apparatus.

In the flowchart of FIG. 6, the determination conditions are added to determine whether or not the two-wheeler is positioned ahead of the own vehicle 40 and the wheels W of the two-wheeler are arranged in the longitudinal direction. If both determination conditions are satisfied, the apparatus enlarges the image search region Ri in the distance direction. If either of the determination conditions is not satisfied, the apparatus does not enlarge the image search region Ri. As described, in a situation where the ranging accuracy of the object declines because the wheels W of the two-wheeler are arranged in the longitudinal direction with respect to the own vehicle 40, the apparatus can precisely detect the two-wheeler using both the radar 21 and the monocular camera 22.

As illustrated in FIG. 8(b), if the two-wheeler is present ahead of the own vehicle 40 and the wheels W of the two-wheeler are arranged in the lateral direction, the two-wheeler possibly passes ahead of the own vehicle 40 and cross a traffic lane. Thereby, the possibility of the collision with the own vehicle 40 may be higher. In this case, it is preferable to prioritize surely detecting the object that may be the two-wheeler, rather than inhibiting the false detection of the two-wheeler.

In the flowchart of FIG. 6, the determination condition is added to determine whether or not the orientation of the two-wheeler is the lateral direction. If the determination condition is satisfied, the apparatus enlarges the image search region Ri in the circumferential direction. For example, the apparatus enlarges the image search region Ri in the circumferential direction, by multiplying the expected error ±Eθi of the angle in the circumferential direction by a predetermined corrective coefficient C2 (C2>1). As described, depending on the degree of collision risk according to the orientation of the two-wheeler, the apparatus can determine more properly the image search region Ri and therefore can enhance a degree of certainty for detecting the two-wheeler using both the radar 21 and the monocular camera 22.

In the above descriptions, as the moving speed of the two-wheeler increases, the detection accuracy may decline in the distance direction that is identified based on the image target. The image region setting unit 14 may enlarge the image search region Ri depending on the moving speed of the two-wheeler. Note that, the moving speed of the two-wheeler can be calculated based on the relative speed of the target detected by the radar target detection unit 11.

Figure 9:
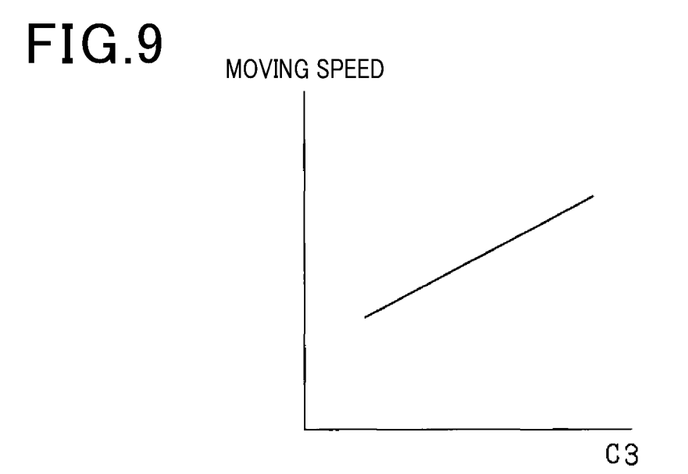
FIG. 9 is a diagram illustrating a correlation between a moving speed of a two-wheeler and a corrective coefficient.

In detail, as illustrated in FIG. 9, using the correlation between the moving speed of the two-wheeler and a corrective coefficient C3 (C3>1), the apparatus enlarges at least either of the distance direction and the circumferential direction of the image search region Ri, as the moving speed of the two-wheeler increases. As described, the apparatus can suppress an influence of the error caused by the moving speed of the two-wheeler, whereby the detection accuracy of a two-wheeler body can be improved by using the radar 21 and the monocular camera 22.

Figure 4:
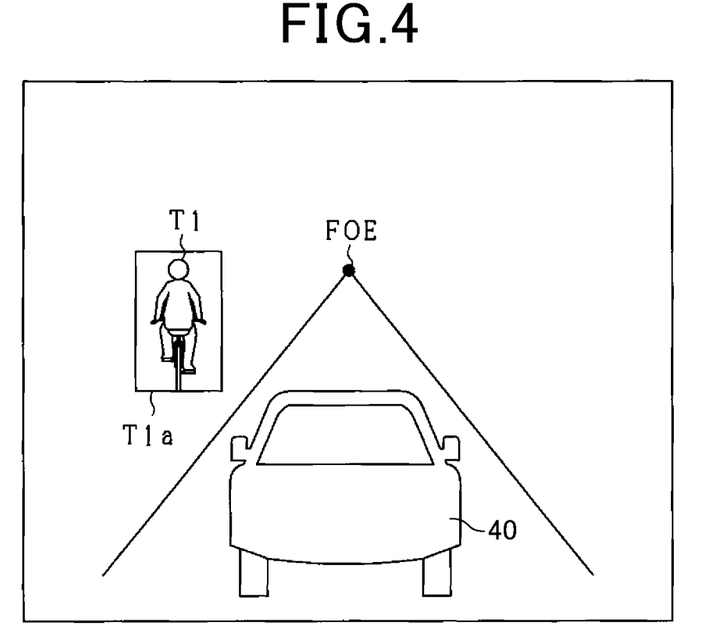
FIG. 4 is a diagram illustrating an example of a captured image.
Figure 10:
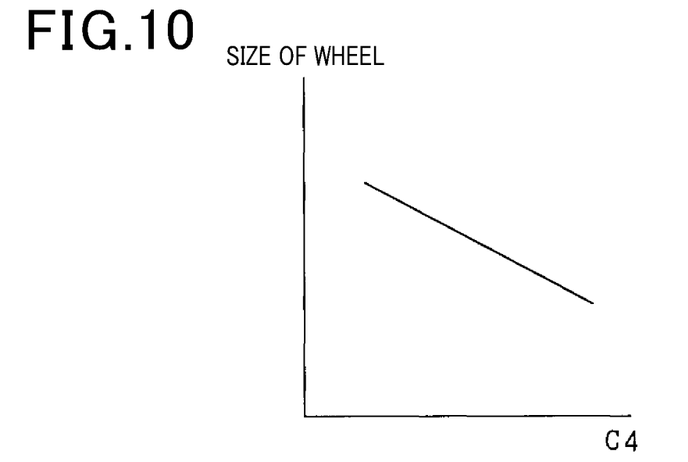
FIG. 10 is a diagram illustrating a correlation between a size of a two-wheeler and a corrective coefficient.

In the above descriptions, as illustrated in FIG. 4, the apparatus calculates the position in the distance direction of the detected position Pi of the image target on the X-Y plane, based on the position of the ground point T1a of the image target. Other than this, the apparatus may identify the position in the distance direction of the image target on the X-Y plane, based on the size of the wheel portions of the two-wheeler in the captured image. That is, if the distance between the own vehicle 40 and the two-wheeler is relatively short, the wheel portions of the two-wheeler's appearing large in the captured image are larger than that of a case where the distance between the own vehicle 40 and the two-wheeler is relatively long. The apparatus can calculate the position in the distance direction of the image target on the X-Y plane, based on the size of the wheel portions of the two-wheeler in the captured image. For example, as illustrated in FIG. 10, by using the correlation between the size of the wheel portions of the two-wheeler and a corrective coefficient C4 (C4>1), the apparatus determines a setting such that the smaller the size of the wheel portions of the two-wheeler, the larger the corrective coefficient C4 is. As described, the apparatus can calculate the position in the distance direction of the image target on the X-Y plane, based on the size of the wheel portions of the two wheeler.

Figure 11:
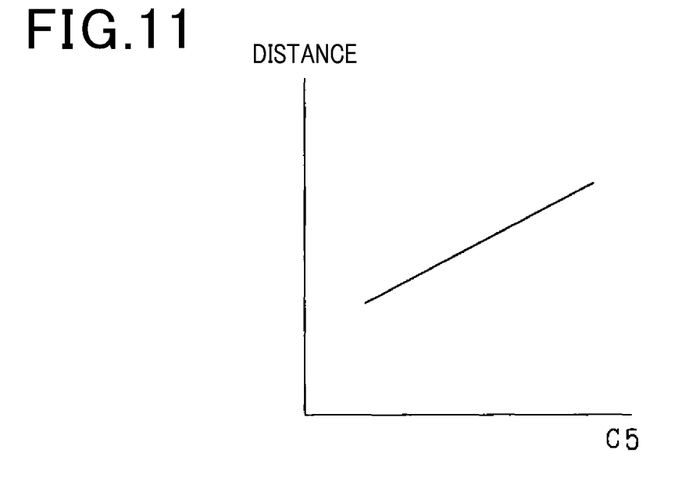
FIG. 11 is a diagram illustrating a correlation between a distance of a two-wheeler and a corrective coefficient.

As the distance between the own vehicle 40 and the two-wheeler is longer, the error included in the detected position of the two-wheeler detected in the image processing of the captured image of the monocular camera 22 tends to be larger. The apparatus may set a degree of enlarging the image search region Ri, depending on the distance between the own vehicle 40 and the two-wheeler. That is, as the two-wheeler is located at farther position with respect to the own vehicle 40, the detected position of the two-wheeler is located at a position closer to FOE, in the captured image illustrated in FIG. 4. Therefore, as the two-wheeler is located at the farther position, the error in the detected position of the two-wheeler increases, the error being caused by the displacement of the ground point T1a of the image target in the captured image. In view of this, the apparatus may set the degree of enlarging the image search region Ri. For example, as illustrated in the map of FIG. 11, if the two-wheeler is located at a relatively near position with respect to the own vehicle 40, the apparatus sets a corrective coefficient C5 (C5>1) to be a small value, the corrective coefficient C5 being used for multiplying the expected error ±Er2a in the distant direction. If the two-wheeler is located at the relatively far position with respect to the own vehicle 40, the apparatus sets the corrective coefficient C5 to be a large value, corrective coefficient C5 being used for multiplying the expected error ±Er2a in the distance direction.

As described above, depending on the distance between the own vehicle 40 and the two-wheeler, the apparatus can enlarge the image search region to inhibit the effect of the error changing depending on the distance between the own vehicle 40 and the two-wheeler, and can precisely detect the two-wheeler using both of the radar 21 and the monocular camera 22.

In the maps in FIGS. 9 to 11 in the above descriptions, the example is illustrated in which respective corrective coefficients C3 to C5 changes linearly. On the other hand, respective corrective coefficients C3 to C5 may be set such that the coefficients change exponentially.

Figure 12:
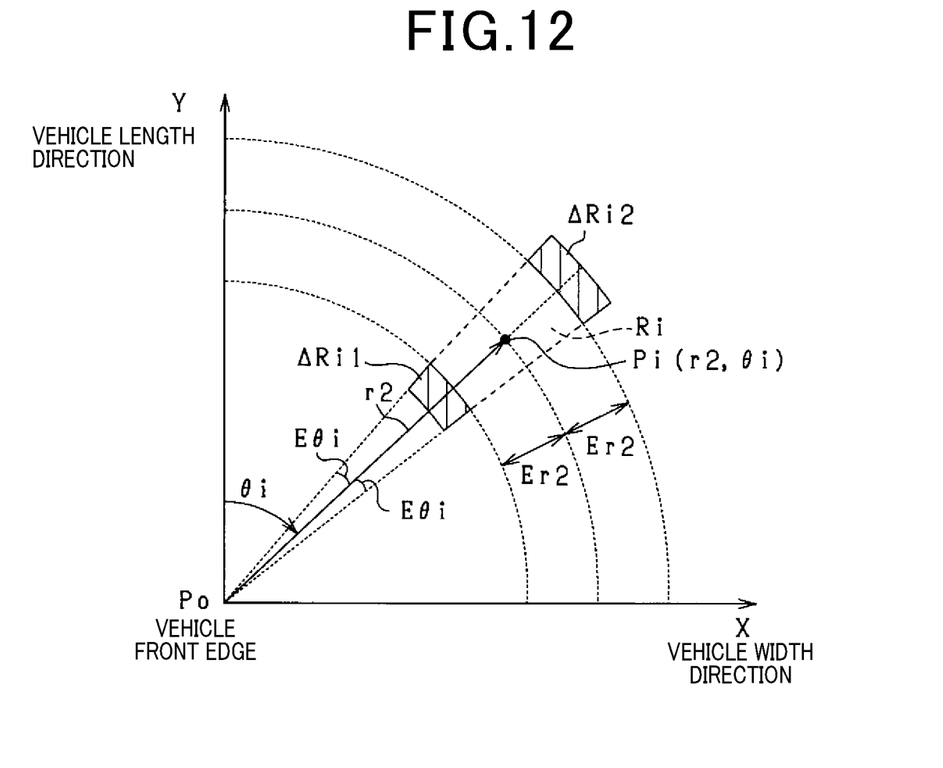
FIG. 12 is a diagram illustrating a relationship between a moving direction of a two-wheeler and an image search region.

In FIG. 1(b), the apparatus includes a moving direction determination unit 16 that determines the moving direction of the two-wheeler. Thus, if the moving direction determination unit 16 can determine the moving direction of the two-wheeler, the image region setting unit 14 may enlarge the image search region Ri depending on the moving direction. For example, if the two-wheeler moves in an orthogonal direction (lateral direction) with respect to the traveling direction of the own vehicle 40, the image region setting unit 14 may enlarge the image search region Ri on a side corresponding to the moving direction. For example, if the two-wheeler moves in the lateral direction and the moving direction is an approaching direction where the two-wheeler approaches the own vehicle 40, the image region setting unit 14 may enlarge an approaching side with respect to the reference point Po in the image search region Ri. For example, as illustrated in FIG. 12, the image region setting unit 14 sets a region in which a region ΔRi1 is added to the image search region Ri, as a new image search region Ri.

On the other hand, if the two-wheeler moves in the lateral direction and the moving away from the own vehicle 40, the image region setting unit 14 may enlarge a separation side with respect to the reference point Po in the image search region Ri. For example, as illustrated in FIG. 12, the image region setting unit 14 sets a region in which a region ΔRi2 is added to the image search region Ri, as a new image search region Ri. As described, if enlarging the image search region Ri depending on the moving direction of the two-wheeler, the apparatus can reduce possibility of the false detection of the two-wheeler and can more precisely detect the two-wheeler using both the radar 21 and the monocular camera 22. Note that, if the two-wheeler moves away from the own vehicle 40, the possibility of the collision is lowered between the own vehicle 40 and the two-wheeler. In this case, the image region setting unit 14 may not enlarge the image search region Ri. On the other hand, if the two-wheeler moves away from the own vehicle 40, the image region setting unit 14 may reduce the image search region Ri. As described, depending on the two-wheeler's moving direction that is determined by the moving direction determination unit 16, the image region setting unit 14 can set the image search region Ri to improve the detection accuracy of the two-wheeler.

As illustrated in FIG. 4, if the apparatus extracts the two-wheeler from the captured image in the matching processing using the target model, it may wrongly extract a region larger than the detection region T1 of the image target. In this case, an error occurs at the position in the distance direction of the image target calculated based on the ground point T1a of the image target. In the processing of S14 in FIG. 6, if the apparatus determines that the image target is the two-wheeler, as illustrated in FIG. 1(b), a reliability determination unit 17 provided for determining a reliability of the object detection by the monocular camera 22 may perform the processing for determining the reliability of the image target. For example, the apparatus detects a distribution of an edge (luminance) in the detection region T1 of the image target. If the distribution of the edge deviates in the detection region T1, the apparatus determines that the reliability of the image target is low, and performs the processing for correcting the ground point T1a of the detection region T1 of the image target.

For example, the apparatus corrects the position of the ground point T1a to be at a boundary between the region including the two-wheeler target and the region including no two-wheeler in the detection region T1 of the image. As described, depending on the image target's the reliability that is determined by the reliability determination unit 17, the image region setting unit 14 can set the degree of enlarging the image search region to improve the detection accuracy of the two-wheeler.

In the above flowchart in FIG. 6, if the image target detection unit 13 determines that the object is not the two-wheeler in S14, it determines whether or not the type of the object is a large animal (a deer, a bear, or the like). If the image target detection unit 13 determines that the type of the object is the large animal, the image region setting unit 14 may set to enlarge the image search region Ri in comparison with the case in which the object is the pedestrian and so on.

In the above described embodiment, the radar target detection unit 11, the image target detection unit 13, and the object detection unit 15 correspond to, respectively, the moving speed determination unit, the two-wheeler vehicle determination unit, and the object determination unit.

The present disclosure is described in accordance with the working example. However, it is understood that the present disclosure is not limited to the working example and the configuration. The present disclosure encompasses various variations, and a deformation within the uniform range. In addition, the category and the concept range in the present disclosure includes various combinations and forms as well as the other combinations and forms having only one element of the various combinations and forms, one or more elements thereof, or one or less element thereof.

PARTIAL REFERENCE SIGNS LIST

10 . . . Object detection apparatus
12 . . . Radar region setting unit
14 . . . Image region setting unit
15 . . . Object detection unit
21 . . . Radar
22 . . . Monocular camera

The invention claimed is:

1. An object detection apparatus detecting an object existing around an own vehicle, using a radar and a monocular camera, comprising:
a radar region setting unit setting, based on a first position which is a detected position of an object detected by the radar, a radar search region including the first position;
an image region setting unit setting, based on a second position which is a detected position of an object detected by the monocular camera, an image search region including the second position;
an object determination unit determining the object detected by the radar and the object detected by the monocular camera to be the same as each other, based on a determination that there is a region in which the radar search region and the image search region overlap with each other; and
a two-wheeler determination unit determining whether a type of the object detected by the monocular camera is a two-wheeler by matching an image of the object with a pre-registered target model, wherein
the image region setting unit is configured to enlarge the image search region based on determining that the type of the object detected by the monocular camera is the two-wheeler, in comparison with a case where the type of the object detected by the monocular camera is not the two-wheeler.

2. The object detection apparatus according to claim 1, wherein
the image region setting unit sets, based on the second position, a first search range in a distance direction from the own vehicle to the object detected by the monocular camera and a second search range in a direction orthogonal to the distance direction, and sets the image search region to be a region surrounded by the first search range and the second search range; and
the image region setting unit enlarges the first search range based on determining that the type of the object detected by the monocular camera is the two-wheeler in comparison with the case where the type of the object detected by the monocular camera is not the two-wheeler.

3. The object detection apparatus according to claim 2, wherein
the first search range includes a range defined from the own vehicle to the second position, and the image region setting unit enlarges the range in a direction from the own vehicle to the object detected by the monocular camera is the two-wheeler in comparison with the case where the type of the object is not the two-wheeler.

4. The object detection apparatus according to claim 3, wherein
the image region setting unit enlarges the first search range, based on a determination whether the two-wheeler is positioned ahead of the own vehicle and wheels of the two-wheeler are positioned in a longitudinal direction state such that the wheels are arranged in a front-back direction with respect to the own vehicle.

5. The object detection apparatus according to claim 3, wherein
the image region setting unit enlarges the second search range, based on a determination whether the two-wheeler is positioned ahead of the own vehicle and wheels of the two-wheeler are positioned in a lateral direction state such that the wheels are arranged in a right and left direction with respect to the own vehicle.

6. The object detection apparatus according to claim 3, comprising a reliability determination unit determining a reliability of an object detection by the monocular camera, wherein the image region setting unit sets an enlargement rate for the image search region, depending on the reliability.

7. The object detection apparatus according to claim 2, wherein
the image region setting unit enlarges the first search range, based on a determination whether the two-wheeler is positioned ahead of the own vehicle and wheels of the two-wheeler are positioned in a longitudinal direction state such that the wheels are arranged in a front-back direction with respect to the own vehicle.

8. The object detection apparatus according to claim 2, wherein
the image region setting unit enlarges the second search range, based on a determination whether the two-wheeler is positioned ahead of the own vehicle and wheels of the two-wheeler are positioned in a lateral direction state such that the wheels are arranged in a right and left direction with respect to the own vehicle.

9. The object detection apparatus according to claim 2, comprising a moving direction determination unit determining a moving direction of the two-wheeler based on the determination that the type of the object detected by the monocular camera is the two-wheeler, wherein
the image region setting unit enlarges the image search region, depending on the moving direction of the two-wheeler.

10. The object detection apparatus according to claim 9, comprising a moving speed determination unit determining a moving speed of the two-wheeler, wherein the image region setting unit enlarges the image search region, depending on the moving speed of the two-wheeler.

11. The object detection apparatus according to claim 10, wherein
the image region setting unit enlarges the image search region, depending on a distance between the own vehicle and the two-wheeler.

12. The object detection apparatus according to claim 11, comprising a reliability determination unit determining a reliability of an object detection by the monocular camera, wherein the image region setting unit sets an enlargement rate for the image search region, depending on the reliability.

13. The object detection apparatus according to claim 2, comprising a moving speed determination unit determining a moving speed of the two-wheeler, wherein the image region setting unit enlarges the image search region, depending on the moving speed of the two-wheeler.

14. The object detection apparatus according to claim 13, wherein
the image region setting unit enlarges the image search region, depending on a distance between the own vehicle and the two-wheeler.

15. The object detection apparatus according to claim 1, comprising a moving direction determination unit determining a moving direction of the two-wheeler based on the determination that the type of the object detected by the monocular camera is the two-wheeler, wherein
the image region setting unit enlarges the image search region, depending on the moving direction of the two-wheeler.

16. The object detection apparatus according to claim 1, comprising a moving speed determination unit determining a moving speed of the two-wheeler, wherein the image region setting unit enlarges the image search region, depending on the moving speed of the two-wheeler.

17. The object detection apparatus according to claim 1, wherein
the image region setting unit enlarges the image search region, depending on a distance between the own vehicle and the two-wheeler.

18. The object detection apparatus according to claim 1, comprising a reliability determination unit determining a reliability of an object detection by the monocular camera, wherein the image region setting unit sets an enlargement rate for the image search region, depending on the reliability.

19. A method of detecting an object existing around an own vehicle, using a radar and a monocular camera, comprising steps of:
a radar region setting step for setting, based on a first position which is a detected position of the object detected by the radar, a radar search region including the first position;
an image region setting step for setting, based on a second position which is the detected position of an object detected by the monocular camera, an image search region including the second position;
an object determination step for determining the object detected by the radar and the object detected by the monocular camera to be the same as each other, based on determination that there is a region in which the radar search region and the image search region overlap with each other; and
a two-wheeler determination step for determining whether a type of the object detected by the monocular camera is a two-wheeler by matching an image of the object with a pre-registered target model; wherein
the image region setting step enlarges the image search region based on determining that the type of the object detected by the monocular camera is the two-wheeler, in comparison with a case where the type of the object detected by the monocular camera is not the two-wheeler.

20. The method of detecting the object according to claim 19, wherein
the image region setting step sets, based on the second position, a first search range in a distance direction from the own vehicle to the object detected by the monocular camera and a second search range in a direction orthogonal to the distance direction, and sets the image search region as a region surrounded by the first search range and the second search range; and
the image region setting step enlarges the first search range based on determining that the type of the object detected by the monocular camera is the two-wheeler in comparison with the case where the type of the object detected by the monocular camera is not the two-wheeler.

* * * * *